Nov. 15, 1927.
C. A. SMITH
1,649,552
WHEEL
Filed March 16, 1922
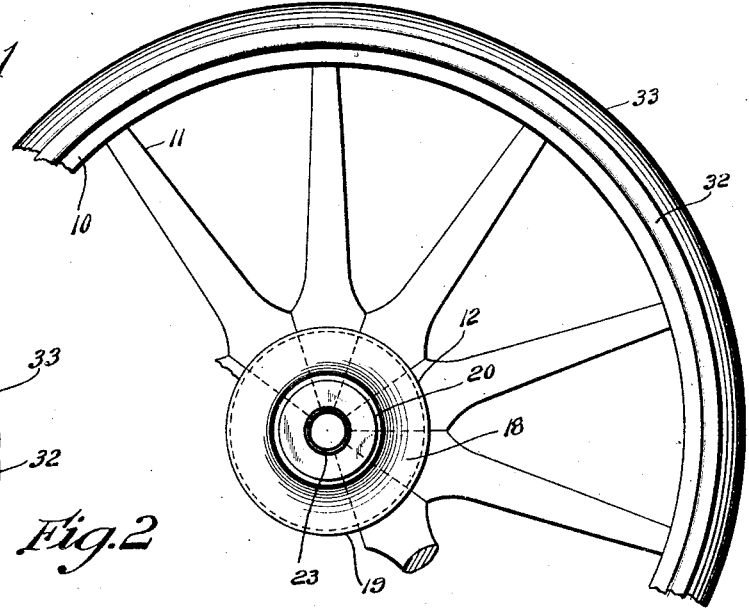
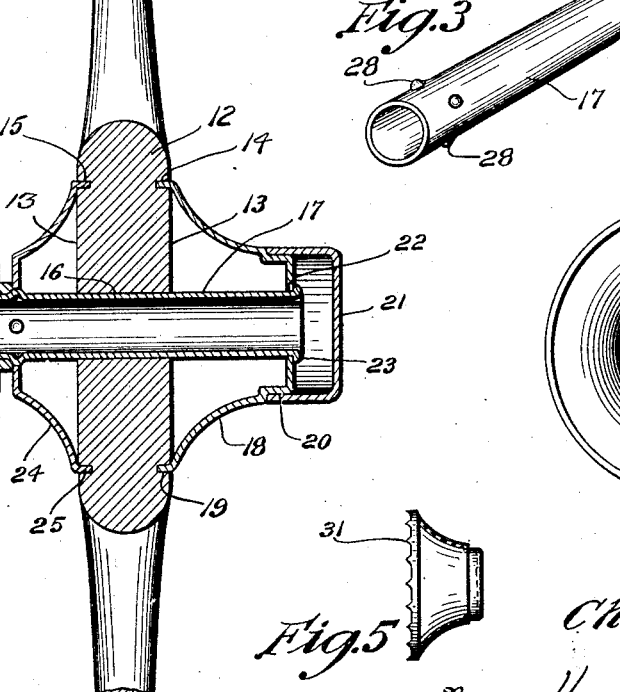
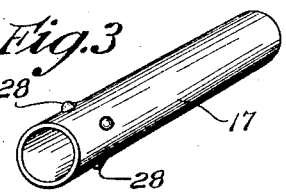
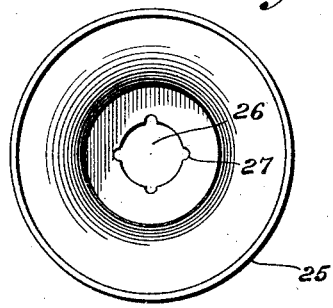
Inventor
Charles A. Smith
By Howard E. Barlow
Attorney Patented Nov. 15, 1927.

1,649,552

UNITED STATES PATENT OFFICE.

CHARLES A. SMITH, OF BRATTLEBORO, VERMONT, ASSIGNOR TO S. A. SMITH MANUFACTURING COMPANY, OF BRATTLEBORO, VERMONT, A CORPORATION OF VERMONT.

WHEEL.

Application filed March 16, 1922. Serial No. 544,253.

This invention relates to improvements in the construction of wheels, more particularly to wheels of the smaller type such as those used on go-carts, baby-carriages, tea-wagons and other similar vehicles, and the object of this invention is to provide such a wheel that is very strong and durable yet which is practical and comparatively inexpensive in construction and at the same time handsome and attractive in appearance and to form the hub body and spokes of the same of wood to which is applied laterally-projecting hub cups or caps secured together through the center of the wheel.

A further object of the invention is to provide an annular groove in each side face of the hub portion of the wheel and to provide hub cups having inturned peripheral edges extending into said grooves, the whole being secured together through the medium of a central binding member.

With these and other objects in view, the invention consists of certain novel features of construction, as will be more fully described, and particularly pointed out in the appended claims.

In the accompanying drawings.

Figure 1 is a side elevation showing a portion of a wheel of my improved construction.

Figure 2 is a central sectional elevation through the wheel.

Figure 3 is a perspective view of the central binding member for receiving the axle.

Figure 4 is an inner view of one of the cups or caps showing a plurality of recesses formed in its inner edge for receiving corresponding protuberances on the central binding member serving as keys to hold these parts against rotation.

Figure 5 is a side elevation of a modified form of hub cup having its edge serrated or provided with spurs to be imbedded into the wooden hub portion of the wheel to prevent relative rotation.

It is found in practice desirable in the construction of wheels for baby carriages, go-carts and other like small vehicles to provide a combination wooden wheel with a metal hub portion and to provide an annular score, recess or groove in either one or both of the opposite faces of the hub portion of the wheel into which an inturned flange portion of the hub cups or caps may tightly fit. Objects are to provide a support for the ends of the central binding member which serves as an axle bearing; second, to lock or tie the hub cups of the spokes together; and third, to render the wheel handsome and attractive in appearance; and the following is a detailed description of one means by which these results may be accomplished:—

With reference to the drawings, 10 designates the wooden felloe of a wheel into which the outer ends 11 of the spokes are set, the inner or hub ends of the spokes being preferably beveled and fitted together providing a continuous hub portion 12.

In the opposite side faces 13 of this hub portion I have provided annular grooves 14 and 15 and the center of this hub portion is bored out as at 16 to receive the central binding member, 17 which is in the form of a tube or sleeve and serves as an axle bearing.

In order to support the outer end of this binding member, I have provided a hub cup 18 having an inturned peripheral flange 19 which is adapted to be forced tightly into the groove 14 in the outer face of the hub portion. This cup is preferably recessed or reduced slightly in diameter near its outer end as at 20 to receive the edge of the outer finishing cap 21 which is adapted to be forced thereover to retain the lubricant and also to provide a finish for the hub. The center of the hub portion is punched out as at 22 to provide an opening for the reception of the outer end 23 of the binding member, 17. I also preferably form another hub cup 24 having an inturned peripheral edge 25 to be set into the groove 15 in the opposite face of the hub portion, the center of which cup is provided with an opening 26 through which the inner end of the binding member 17 passes and the edge of this opening is preferably provided with a plurality of recesses 27 to receive correspondingly shaped protuberances 28 on the binding member 17, so as to prevent a relative rotation of the binding member and the other parts of the hub. In some cases I mount a collar 29 on the inner end of this tube, the same having a flange 30 which may be engaged by a clip mounted on the axle (not shown), to retain the wheel in position thereon.

In order to bind both of these cup members 18 and 24 securely to the hub portion of the wheel and retain their inturned flanges in their respective recesses 14 and 15, I preferably roll outwardly or rivet over the ends of this binding member thereby securely binding all of the members and parts together.

It is found in practice that by scoring the face of the hub portion of the wheel and inserting the flange of the cup thereinto that this structure serves to securely bind the spokes together, also prevents any movement of the cup which might be due to any strain on the outer ends of the binding member and by keying the binding member to one of these hub cups the same is prevented from a relative rotation from the other parts of the hub.

This binding member may be of a size to fit the axle of the vehicle or it may be of a size to receive either ball or roller bearings in which the vehicle axle may fit.

In some cases instead of forming the inturned edge of the hub cup smooth I may serrate, corrugate or provide one or more spurs 31 on the edge of the cup adapted to be pressed or forced into the hub surface of the wheel in which case the annular groove may be omitted, if desired.

In some cases the inner hub cup may also be omitted, if desired.

I have shown a steel channeled or grooved metal tire 32 about the felloe of the wheel and into this I preferably mount the usual rubber tire 33.

My improved wheel is extremely strong and durable as well as being very simple and practical in construction and by the use of hollow hub cups the opposite bearing ends of the central binding member receive firm support and when finished this hub portion presents a very handsome and attractive appearance.

The foregoing description is directed solely towards the construction illustrated, but I desire it to be understood that I reserve the privilege of resorting to all the mechanical changes to which the device is susceptible, the invention being defined and limited only by the terms of the appended claims.

As shown in Fig. 4 the cup-shaped sheet-metal hub caps 18 and 24 seat upon wooden hub 13 immediately inside the flanges 19 and 25 which project into annular grooves 14 and 15, whereby the caps and hubs are firmly positioned relatively to each other—radially by the flanges and grooves and axially by engagement immediately inside the grooves. By radially flaring the caps toward the hub as shown in Fig. 4 the lines of pressure between the hub and caps extend transversely of the sheet material of which the caps are formed, whereby the elasticity of the sheet material may be utilized effectively.

Another advantage of this construction consists in that both radial and axial bearing surfaces between hub and caps are provided without radial flanges, whereby the caps may be made of sheet material of uniform thickness without striking up lugs or flanges transversely of the sheet. Moreover, since the cup-shaped sheet-metal caps seat on the hub inside the grooves, the peripheral edges of the caps need not seat in the bottom of the grooves with uniform pressure throughout the entire extent of the grooves; consequently in stamping out the caps from sheet material no particular care need be exercised to prevent uneven edges around the outer peripheries of the caps which would ordinarily result either from uneven cutting or from distortion in the subsequent shaping operation.

I claim:

1. A wheel having spokes assembled to form a wooden hub having an axial opening therethrough, annular grooves in the faces of the hub concentric with said opening, sheet-metal cup-shaped hub caps on opposite sides of the wooden hub, and means including a tube extending through said opening and through the hub caps for clamping the caps against the hub, the spaces between the hub caps and tube being empty, the peripheral portions of the cap being bent into approximate parallelism with the axis of the wheel and extending into the grooves, the caps flaring outwardly intermediate the tube and grooves and meeting the hub inside said grooves at small angles so that the lines of pressure between the hub and caps immediately inside the grooves extend transversely of the sheet material of which the caps are formed, whereby the lines of pressure between the hub and caps extend transversely of the sheet material of which the caps are formed.

2. A wheel having spokes, a rim encompassing the outer ends of the spokes, a hub formed by the inner ends of the spokes and having a groove formed in its side a member having an inturned serrated edge seated in the groove and a binding member passing through the hub and the serrated edged member for securing the serrated edged member against outward movement with relation to the hub.

3. In a wheel having spokes, a rim supported by the outer ends of the spokes, the inner ends of said spokes forming a hub portion having an annular groove in one of its side faces, a hub flange provided with an inturned annular peripheral edge fitted into said groove, a central binding member in contact with said spokes securing said flange to said hub portion, and means integral with said member for preventing a relative rotation of said flange and binding member.

4. In a wheel having a hub portion, an annular groove in each of the opposite faces of said hub portion, cup-shaped hub flanges struck from sheet metal each having an annular inturned serrated lip and positioned on opposite sides of said hub portion with said lip extending into its groove, and a central binding member in contact with said hub portion by which said two hub cups are secured in position on said hub portion.

5. A wheel having a hub grooved on its opposite sides, cup shaped members having inturned serrated portions seated in the grooves, a binding member passing through the cup shaped members and having its ends rolled for securing the cup shaped members in operative relation to the hub.

6. In a wheel having a hub portion provided with an annular groove in each of its opposite faces, hub cups having inturned peripheral edges fitted into said grooves, a central binding member for connecting said opposite cup shaped hub members and binding them in position to the hub portion of the wheel, and raised portions on said binding member for preventing a relative rotation thereof.

7. A wheel having a hub portion, a cup shaped member having inturned teeth adapted to be imbedded in the hub portion and a binding member for securing the teeth against outward movement with relation to the hub.

8. In a wheel having a hub portion provided with an annular groove in one of its side faces, a sheet metal hub flange provided with an inturned annular peripheral serrated edge fitting into said groove, and a central binding member for securing said flange to said hub portion.

9. A wheel having spokes assembled to form a wooden hub having an axial opening therethrough, an annular groove in one face of the hub concentric with said opening, a sheet metal cup-shaped hub cap, and means for clamping the cap against said face, said means including a tube extending through said cap and opening, said cap flaring radially toward the wooden hub and the flare increasing so that the outer surface of the cap is concave in axial section, the flare increasing until the cap meets the wooden hub at a small angle and the peripheral margin of the cap then extending into said groove approximately parallel with the axis of the wheel, whereby the lines of pressure between the hub and cap extend transversely of the sheet material of which the cap is formed.

10. A wheel construction comprising a plurality of wooden spokes, a sleeve extending through the center of said spokes and a pair of hub members having serrated edges carried by said sleeve with their oppositely disposed serrated edges embedded in said spokes.

11. A wheel of the character described comprising a load-sustaining body portion, a co-axial box therethrough, substantially cup-like conical resilient side plates having bases at right angles to their axes and their extreme edges set in the material of the load sustaining portion, and confined under strain by compression between the ends of the box.

12. In a wheel of the character described, a wooden load sustaining body part, a co-axial metal box engaged therethrough, dished sheet metal hub plates confined between the ends of said box and said body part extending diagonally in buttress form from the ends of said box toward the wheel, said plates having inturned spurs thereon at their peripheries embedded in said load-sustaining body.

13. A wheel having spokes assembled to form a wooden hub having an axial opening therethrough, sheet-metal cup-shaped hub caps on opposite sides of the wooden hub, and means including a tube extending through said opening and through the hub caps for clamping the caps against the hub, the spaces between the hub caps and the tube being empty, the peripheral portions of the cap being bent into approximate parallelism with the axis of the wheel and embedded in the wooden hub, the caps flaring outwardly intermediate the tube and said peripheral portions and meeting the hub inside said peripheral portions at small angles so that the lines of pressure between the hub and caps immediately inside the peripheral portions extend transversely of the sheet material of which the caps are formed, whereby the lines of pressure between the hub and caps extend transversely of the sheet material of which the caps are formed.

14. A wheel having spokes assembled to form a wooden hub having an axial opening therethrough, a sheet metal cup-shaped hub cap, and means for clamping the cap against the face of said hub, said means including a tube extending through said cap and opening, said cap flaring radially toward the wooden hub and the flare increasing so that the outer surface of the cap is concave in axial section, the flare increasing until the cap and the wooden hub subtend a small angle and peripheral portions of the cap then extending into said wooden hub approximately parallel with the axis of the wheel, whereby the lines of pressure between the hub and cap extend transversely of the sheet material of which the cap is formed.

In testimony whereof I affix my signature.

CHARLES A. SMITH.